(No Model.)
C. D. PARKS.
SPRINKLER.
No. 358,693. Patented Mar. 1, 1887.
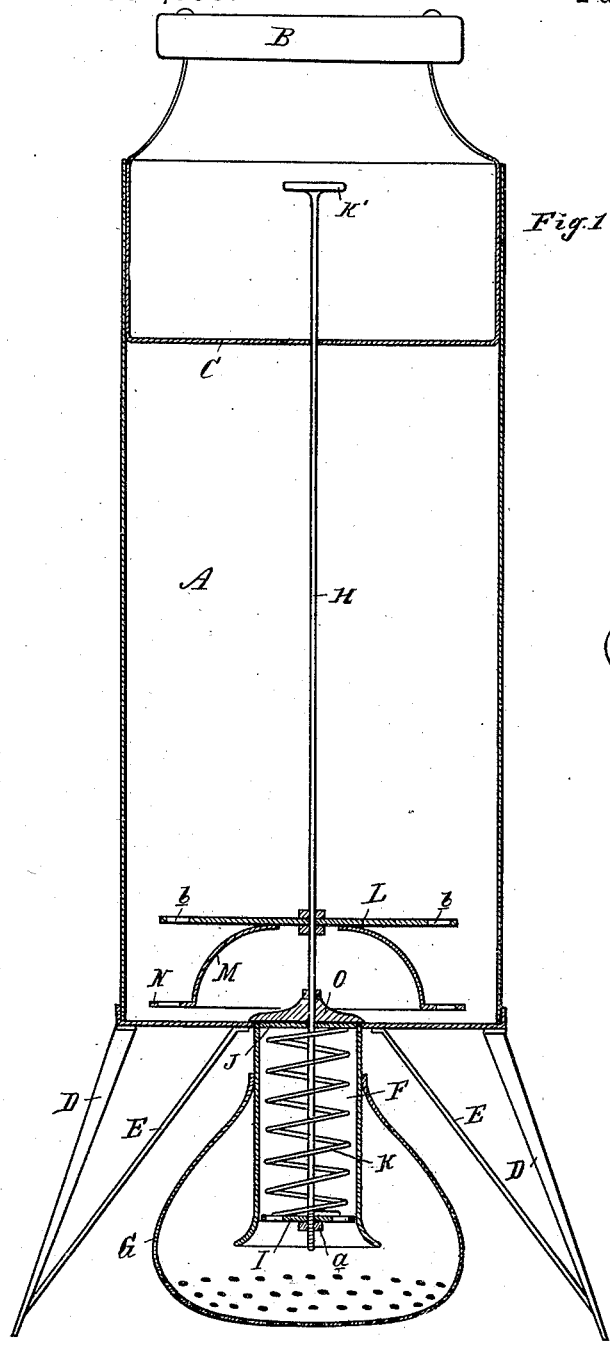
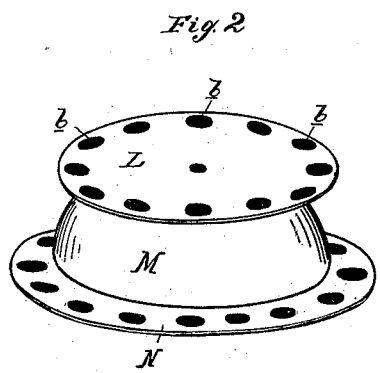
Fig. 1
Fig. 2
Attest:
John Schuman
Inventor:
Charles D. Parks.
by his Atty
Thos. J. Sprague

UNITED STATES PATENT OFFICE.

CHARLES D. PARKS, OF SARANAC, ASSIGNOR OF TWO-THIRDS TO ROBT. D. PARKS AND CLARENCE W. PARKS, OF MECOSTA, MICHIGAN.

SPRINKLER.

SPECIFICATION forming part of Letters Patent No. 358,693, dated March 1, 1887.

Application filed November 24, 1886. Serial No. 219,826. (No model.)

*To all whom it may concern:*

Be it known that I, CHARLES D. PARKS, of Saranac, in the county of Ionia and State of Michigan, have invented new and useful Improvements in Sprinklers; and I do hereby declare that the following is a full, clear, and exact description thereof, reference being had to the accompanying drawings, which form a part of this specification.

This invention relates to certain new and useful improvements in sprinklers.

The object of this invention is to provide a sprinkler more especially designed for sprinkling a solution of paris-green upon vines for the purpose of killing insects, and wherein an agitator is provided for preventing settling and consequent clogging of the valve.

To this end the invention consists in the peculiar construction, arrangement, and combinations of the parts, all as more fully hereinafter set forth.

Figure 1 is a vertical central longitudinal section of my improved sprinkler. Fig. 2 is a perspective view of the agitator removed.

In the accompanying drawings, which form a part of this specification, A represents a cylindrical reservoir closed at its lower end. At its upper end it is provided with a handle, B, by means of which it may readily be carried, and across the mouth of the reservoir is secured a girt, C. The reservoir is mounted upon legs D, which are braced by braces E, which latter also tend to support and strengthen the bottom of the reservoir. In the bottom of the reservoir there is a central opening communicating with a tube, F, which projects into a sprinkling-nozzle, G, and to which it is preferably removably secured in any convenient manner, although I show it in the drawings as rigidly secured to the tube F, the discharge end of which is flaring.

H is a valve-stem, the lower end of which carries a perforated disk, I, within the tube F, and rests upon an adjusting-nut, *a*. Around the valve-stem is placed a coil-spring, K, its lower end resting upon the disk I, while its upper end finds resistance against a bridge or spider, J, secured across the mouth of the tube F, and through which the valve-stem passes up to and through the girt C, its upper end terminating in a pull-handle, K'.

O is a valve secured to the valve-stem H.

L is a disk secured to the valve-stem, and this disk is perforated, as at *b*, near its outer edge.

M is an inverted cup secured to the under face of the disk L, terminating at its lower edge in a perforated flange, N.

In practice the reservoir is filled or partially filled with a mixture of paris-green and water. The operator, carrying the device by the handle, walks along the row of vines to be sprinkled, and at each hill he pulls up the valve-stem, thereby allowing the mixture to flow to the sprinkling-nozzle, from whence it is discharged upon the plant. Upon releasing the valve-stem the valve is seated over the discharge, while the confined air in the upper part of the nozzle prevents leaking or dropping as the device is carried from vine to vine. This repeated reciprocation of the valve-stem and the agitator prevents a settling of the paris-green and a consequent clogging of the valve, while the cup M and its flange N tend to force the water to the sides of the reservoir and "wash" from the valve any matter that may have settled there. The lower end of the tube F being flaring and the disk I perforated at its outer edge in the action of the device tend to force the mixture toward the outer edge of the nozzle, and thus cause a more even distribution of the mixture.

The tension of the spring can readily be regulated by the adjusting-nut *a*.

What I claim as my invention is—

1. In a device for the purpose described, the combination of a reservoir, A, sprinkling-nozzle, G, flaring tube F, valve-stem H, valve O, spring K, and perforated disk I, carried by said stem within the tube, constructed, arranged, and operating in the manner and for the purpose set forth.

2. In a device for the purpose described, the combination of a reservoir, A, provided with a sprinkling-nozzle, G, and a valve, O, with an agitator consisting of the perforated disk L, cup M, and perforated flange N, connected together and carried by the valve-stem, substantially as described.

3. In a device for the purpose described, the combination of the reservoir A, provided with a handle, B, and legs D, with the tube F, sprinkling-nozzle G, valve-stem H, valve O, disk I on said stem within the tube F, spring K, perforated disk L, cup M, and perforated flange N, all connected together and carried by the valve-stem, the parts being constructed, arranged, and operating as and for the purposes specified.

CHARLES D. PARKS.

Witnesses:
 THAD. MERCER,
 CHAS. E. MERCER.